United States Patent [19]

Rosenberg

[11] Patent Number: 4,806,217

[45] Date of Patent: Feb. 21, 1989

[54] BACK-FLUSHABLE FILTER AND PRESSURE-REGULATOR PARTICULARLY USEFUL THEREWITH

[76] Inventor: Peretz Rosenberg, Moshav Beit, Shearim, Israel

[21] Appl. No.: 105,072

[22] Filed: Oct. 6, 1987

[30] Foreign Application Priority Data

Oct. 16, 1986 [IL] Israel ............................... 80341

[51] Int. Cl.[4] ........................................ B01D 29/38
[52] U.S. Cl. .................................. 210/108; 210/232; 210/333.1; 210/390; 210/393; 210/427; 137/505; 137/505.15; 137/505.25; 137/508
[58] Field of Search ............ 210/100, 108, 232, 333.1, 210/333.01, 390, 391, 393, 411, 427, 437; 137/505, 505.25, 508

[56] References Cited

U.S. PATENT DOCUMENTS

| | | | |
|---|---|---|---|
| 2,002,717 | 5/1935 | Robart et al. | 137/505 |
| 2,488,649 | 11/1949 | Teague | 137/505 |
| 3,368,680 | 2/1968 | Bozek | 210/90 |
| 3,542,202 | 11/1970 | Ball | 210/232 |
| 3,890,999 | 6/1975 | Moskow | 137/505.25 |
| 4,271,018 | 6/1981 | Drori | 210/107 |
| 4,295,963 | 10/1981 | Drori | 210/108 |
| 4,474,207 | 10/1984 | Rosenberg | 137/505 |
| 4,561,465 | 12/1985 | Rogers | 137/614.05 |
| 4,592,839 | 6/1986 | Rosenberg | 210/352 |

FOREIGN PATENT DOCUMENTS

0149931 11/1984 European Pat. Off. .
0205407 12/1986 European Pat. Off. .
2137895A 10/1984 United Kingdom .

*Primary Examiner*—David L. Lacey
*Assistant Examiner*—Andrew J. Anderson
*Attorney, Agent, or Firm*—Benjamin J. Barish

[57] ABSTRACT

A filter device comprises a central tube, a housing enclosing the central tube and defining an internal chamber therewith, and a filter body within the internal chamber. The central tube includes a plug between the inlet and outlet which directs the fluid to flow from the inlet through the filter body and out through the outlet. The housing and filter body are mounted for sliding movement axially of the central tube from a normal filtering position wherein the housing inlet communicates with the upstream side of the filter body, to a back-flushing position wherein the inlet communicates with the downstream side of at least a portion of the filter body. The housing may also include a valve member moved therewith under differential pressure between the housing inlet and outlet to regulate the pressure at the outlet.

22 Claims, 2 Drawing Sheets

BACK-FLUSHABLE FILTER AND PRESSURE-REGULATOR PARTICULARLY USEFUL THEREWITH

BACKGROUND OF THE INVENTION

The present invention relates to a back-flushable filter and also to a pressure-regulator. The invention is particularly useful when incorporating the pressure-regulator and the back-flushable filter in a single unitary device, and is therefore described below with respect to this application, but it will be appreciated that the pressure-regulator could also be used in other applications, and that the back-flushable filter could also be used without the pressure regulator.

Many types of back-flushable filters (namely those wherein the filter body is cleaned by applying the pressurized fluid to the downstream face of the filter body) have been developed and are now in use, particularly in water irrigation systems to remove the dirt particles from the irrigating water before they can reach the irrigating devices, such as sprinklers, drippers, and the like. Such filters usually have to be protected against an undue build-up of pressure within the filter housing, which could result in a dangerous explosion. For this reason, the filter line usually includes a separate pressure-regulator which acts to regulate the pressure within the filter housing, and/or to shut-off the input line from the filter housing should the pressure within the housing rise to a dangerous level. Such pressure-regulators, however, are quite expensive and frequently cost as much or more than the filter itself.

BRIEF SUMMARY OF THE INVENTION

An object of the present invention is to provide a filter device of a structure which permits back-flushing the filter body in a quick and convenient manner whenever desired to clean the filter body of the solid particles lodged within it. Another object is to provide a pressure-regulator which can be constructed as part of the filter device itself, and thereby substantially reduces the total cost of the filter plus pressure-regulator.

According to one aspect of the present invention, there is provided a filter device comprising a central tube having an inlet end and an outlet end connectible into a fluid line for the fluid to be filtered; a housing enclosing the central tube and defining an internal chamber therewith; and a filter body within the internal chamber; the central tube including an inlet opening therethrough at the inlet end, an outlet opening therethrough at the outlet end, and a plug between the inlet and outlet openings directing the fluid to flow from the inlet opening through the filter body and out through the outlet opening. The housing and filter body are mounted for sliding movement axially of the central tube from a normal filtering position wherein the central tube inlet opening communicates with the upstream side of the filter body, to a back-flushing position wherein the central tube inlet opening communicates with the downstream side of at least a portion of the filter body; and a passageway formed in the outlet end of the housing permitting the outletting therethrough of the fluid when the housing has been moved to the back-flushing position.

According to another aspect of the present invention, there is provided a pressure-regulator device, comprising: a central tube having an inlet end and an outlet end connectible into a fluid line whose pressure is to be regulated; and a housing enclosing the central tube and defining an internal chamber therewith. The central tube includes an inlet opening therethrough at the inlet end, an outlet opening therethrough at the outlet end, and a plug between the inlet and outlet openings directing the fluid to flow from the inlet opening into the internal chamber and out through the outlet opening. The housing is mounted for sliding movement axially of the central tube. A valve member is disposed within the housing and mounted for movement therewith toward and away from the inlet opening in the central tube to thereby restrict or enlarge the inlet opening. The housing includes surface areas exposed to the the fluid pressure within the housing producing a differential pressure normally effective to move the housing in one direction with respect to the inlet opening in the central tube, and a spring normally urging the housing and valve member carried thereby in the opposite direction with respect to the inlet opening in the central tube.

In the preferred embodiment of the invention described below, the housing includes a filter body within the internal chamber effective to filter the fuild passing therethrough; but it will be appreciated, as indicated above, that the novel pressure regulator could be used in many other applications as well.

Further features and advantanges of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
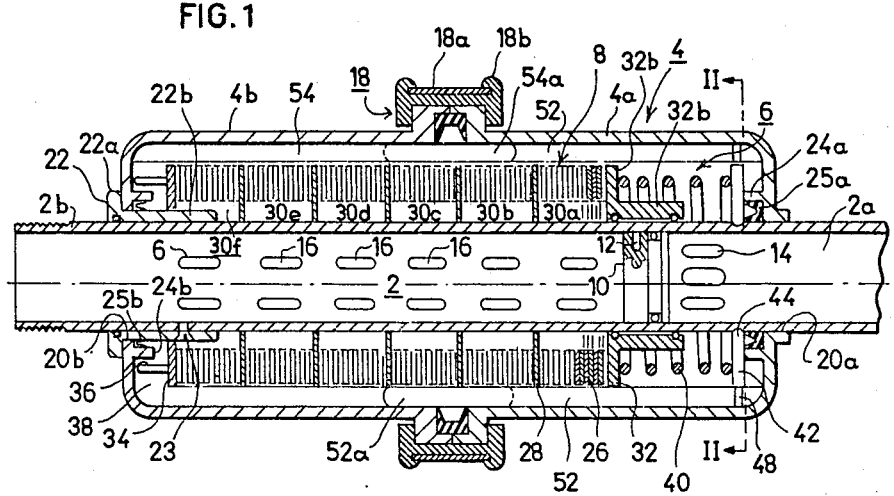
FIG. 1 is a longitudinal sectional view illustrating one form of pressure-regulated back-flushable filter constructed in accordance with the present invention.

The filter illustrated in the drawings incorporates a pressure-regulator feature which automatically prevents an undue build-up of pressure within the filter, and also a back-flushable feature which permits the filter body to be cleaned in a quick and convenient manner without opening the filter housing. With respect to the latter feature, it is only necessary to slightly rotate the filter about its longitudinal axis, and then to move the filter parallel to its longitudinal axis, whereupon the filter body is throughly cleaned by back-flushing.

More particularly, the pressure-regulated back-flushable filter illustrated in the drawings comprises a central tube 2 and a housing 4 enclosing the central tube and defining an internal chamber 6 therewith in which is disposed a filter body, generally designated 8. End 2a of the central tube 2 constitutes the inlet end connectible to the fluid supply line, (e.g., a water irrigation line), and end 2b constitutues the outlet end of the tube through which the irrigating water flows after being filtered by the filter body 8 within the housing 4.

A solid plug 10 is fixed, e.g., by one or more pins 12, within the central tube 2 adjacent its inlet end 2a. Central tube 2 is formed with a circular array of inlet openings 14 at the inlet side of plug 10, and with a plurality of circular arrays of outlet openings 16 at the outlet side of the plug. It will thus be seen that plug 10 directs the water from the inlet end 2a through the inlet openings 14 into chamber 6, then through the filter body 8 to the oulet openings 16 and out through the outlet end 2b.

The filter housing 4 is of cylindrical shape and is comprised of two sections 4a, 4b having flanged confronting faces clamped together by a strap-clamp 18. Clamp 18 may be of the type described in copending patent application No. 06/936,850, now U.S. Pat. No. 4,731,178 including a flexible band 18a joining a plurality of spaced rigid (e.g., plastic) elements 18b drawn together by a draw-bolt and shackle (not shown).

The inlet end of housing section 4a is formed with a central opening 20a for accomodating the inlet end 2a of the central tube 2; and the outlet end of housing section 4b is also formed with a central opening 20b for accomodating the outlet end 2b of the central tube. As noted particularly in FIG. 1, opening 20a in housing section 4a is of substantially the same diameter as the outer diameter of the central tube 2, but opening 20b in housing section 4b is of slightly larger diameter and accomodates a bushing 22 which is fixed by pin 23, to central tube 2. Bushing 22 includes an enlarged head 22a engageable with the outer face of housing section 4b and a tubular section 22b surrounding the central tube 22 and slidably receiving the outlet end of housing section 4b. The two openings 20a, 20b in the housing sections 4a, 4b are circumscribed by annular ribs 24a, 24b for receiving sealing rings 25a, 25b.

Filter body 8 includes a plurality of annular filter discs 26 and a plurality of annular partition discs 28, all arranged as a stack and slidably received on the outer face of the central tube 2. The filter discs 26 may be of any known construction including ribbed side faces defining filtering passages for filtering the water passing between the discs. The partition discs 28 divide the filter discs 26 into a plurality of filter sections each including a plurality of filter discs 26 between a pair of partition discs 28.

Figure 3:
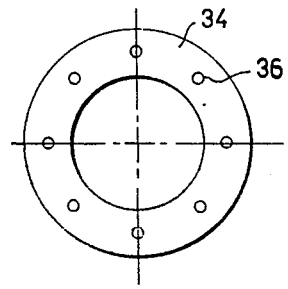
FIG. 3 is a fragmentary view illustrating one of the elements in the filter of FIGS. 1 and 2.

The partition discs 28 have internal diameters which are substantially the same as the outer diameter of the central tube 2, but the filter discs 26 have inner diameters which are substantially larger. Thus, each of the filter sections between two partition discs 28 defines a compartment 30a–30f between the outer face of the central tube and the inner faces of the filter discs 26. The first compartment 30a, however, is bounded by a valve member 32 for a reason to be described below, and the last compartment 30f is bounded by an end disc 34 received over the tubular section 22b of bushing 22. End disc 34 is formed with a circular array of axially-extending fingers 36 (FIG. 3), to space the end disc from the inner face of the end wall of housing secion 4b, and thereby to provide a space 38 for the fluid to flow during a back-flusing operation, as will be described below.

Central tube 2 is formed with a circular array of the outlet openings 16 aligned with each of the compartment 30a–30f of the filter body 8. Thus, in the example illustrated, filter body 8 is formed with six filter sections each including a compartment 30a–30f, and therefore the central tube is formed with six circular arrays of outlet openings 16.

The previously-mentioned tubular valve member 32 cooperates with the inlet openings 14 through the central tube 2 in order to regulate the pressure within the housing 4. Valve member 32 comprises a tubular section 32a slidably received over the outer face of central tube 2, and an annular flange 32b having an outer diameter substantially equal to that of the filter discs 26 and partition discs 28. The annular flange 32b of valve member 32 is pressed against the stack of filter discs 26 by a spring 40 interposed between the annular flange 32b and another disc 42 at the inlet end of the housing 4 bearing against annular rib 24a.

Figure 2:
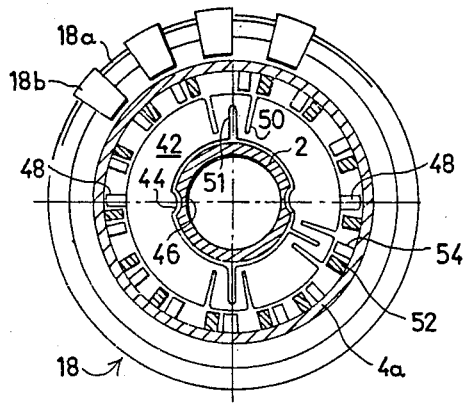
FIG. 2 is a transverse sectional view along line II—II of FIG. 1.

The structure of disc 42 is more particularly illustrated in FIG. 2. It is also of annular shape, having an inner diameter substantially the same as the outer diameter of the central tube 2. However, disc 42 is formed with a pair of inwardly-extending projections 44 received within recesses 46 formed in the outer face of the central tube 2. Each recess 46 is very short, extending axially of the tube for a distance substantially equal to the thickness of disc 42. Disc 42 is also formed with a plurality of outer fingers 48 engageable with the inner face of housing section 4a.

Disc 42 is further formed with a plurality of radially-extending slots 50, starting at its outer face and terminating short of its inner face. These slots are staggered with a plurality of further radially-extending slots 51 starting at the inner face of the disc and terminating short of the outer face. This slotted construction of disc 42 imparts sufficient flexibility to the disc to permit it to be expanded in the radial direction a sufficient distance to unseat its inner projections 44 from the short recesses 46 formed in the outer face of the central tube 2, when it is desired to perform a back-flushing operation as will be described more particularly below.

The outer fingers 48 of disc 42 are received in the spaces between a plurality of axially-extending, circumferentially-spaced ribs 52 formed on the inner face of housing section 4a. The inner face of housing section 4b is similarly formed with a plurality of axially-extending circumferentially-spaced ribs 54. As shown in FIG. 2, the ribs of both set 52, 54 are spaced from each other several times their widths so that there is ample space between ribs 52 for receiving the outer fingers 48 of disc 42. In addition, both sets of ribs 52, 54 include projections 52a, 54a projecting from the clamped confronting ends of the two housing sections 4a, 4b, which projections interfit with each other when the two sections are clamped together as shown in FIG. 1.

Disc 42 is called a coupling disc, since it is effective to couple or decouple the housing 4 with respect to the central tube 2. Thus, in the position of coupling disc 42 illustrated in FIGS. 1 and 2 (which is the position of the disc during the normal filtering mode of operation), the inner projections 44 of coupling disc 42 are seated within the short recesses 46 formed in the outer surface of the central tube 2, and thereby couple the housing 4 to the central tube, permitting only restricted movement (rightwardly, FIG. 1) of the housing with respect to the central tube according to the contraction of spring 40. However, when housing 4 is rotated about its longitudinal axis, slots 50, 51, permit the coupling disc to expand radially and to unseat its projections 44 from the short recesses 46 in the outer face of the central tube 2, thereby decoupling the housing from the central tube and permitting the housing unrestricted movement (rightwardly, FIG. 1) with respect to the central tube. The latter operation is performed when it is desired to back-flush the filter, in a manner described below particularly with reference to FIG. 4.

The pressure-regulated back-flushable filter illustrated in the drawings operates as follows:

FIGS. 1 and 2 illustrate the condition of the filter during the normal filter mode, wherein projections 44 of the coupling disc 42 are seated within the short recesses 46 formed in the outer face of the central tube 2. During this mode of operation, coupling disc 42 forms a seat for one end of spring 40, the opposite end of the spring bearing against the annular flange 32b of valve member 32, urging that valve member leftwardly, and also thereby urging the filter discs 26 and partition discs 28 leftwardly limited by the fingers 36 of end discs 34 bearing against the inner face of housing section 4b. In this condition of the filter, the filter discs 26 are pressed firmly against each other in the form of a tight stack so as to filter the water inletted via the inlet end 2a of the central tube 2. During this filtering mode, the water passes through inlet openings 14 into chamber 6; through the spaces between the axial ribs 52a, 52b formed on the inner faces of the housing sections 4a, 4b; radially through the filter discs 26 of the plural sections of the filter body 8 defined by the partition discs 28; through the compartments 30a–30f of the filter body; through the outlet openings 16 aligned with these compartments; and finally through the outlet end 2b of the central tube. It will thus be seen that during this normal filtering mode, the dirt in the water inletted into the filter will be separated from the water by the filter discs 26 before the water exits form the outlet end 2b, the separated particles accumulating on the outer faces, and between the side faces, of the filter discs 26.

FIG. 1 also illustrates the condition of the parts when the pressure within housing 4 is below a predetermined maximum pressure. Should the pressure within housing 4 begin to rise above its predetermined maximum, a differential pressure is produced within housing 4 tending to move the housing rightwardly against the force of spring 40. That is, since opening 20a formed in housing section 4a is of smaller diameter than opening 20b formed in housing section 4b, the larger surface area of the end wall of housing section 4a, as compared to that of housing section 4b, will cause the pressure of the water within the housing to exert a larger force against the end wall of housing section 4a than that against the end wall of housing section 4b. This differential pressure will move the two housing sections (clamped by clamping band 18) in the rightward direction. This movement of the housing is transmitted via fingers 36 and end disc 34, to the stack of discs constituting the filter body 8, and also to valve member 32 at the right end of the stack of discs. The rightward movement of housing 4 and filter body 8 is resisted by spring 40 since its right end bears against coupling disc 42 which is coupled to the central tube 2 via the inner projections 44 of the coupling disc seated within the short recesses 46 in the central tube.

Thus, as the pressure within housing 4 increases above the predetermined maximum, valve member 32 moves rightwardly to cover part of the inlet openings 14, thereby restricting the cross-sectional area of these openings and the flow of the water inletted into chamber 6, until the pressure within the filter housing is reduced to the predetermined maximum pressure. This arrangement thus prevents the pressure within the housing from rising above a predetermined maximum value during the normal filtering mode of operation. The maximum pressure is determined by spring 40; this spring can be selected to cause valve member to completely close inlet openings 14, so that the device also acts as a shut-off valve.

When it is desired to clean the filter, this can be done by producing a back-flushing mode of operation in the following manner: The user manually grips the filter housing 4 and rotates it slightly about its longitudinal axis. Since the outer fingers 48 of the coupling discs 42 are received within the spaces between the ribs 52a formed in the inner face of housing section 4a, the rotation of the housing will also rotate the coupling disc 42 until the inner projections 44 formed in the coupling disc are unseated from the short recessed 46 formed in the outer face of the central tube 2. The coupling disc is expansible for this purpose by virtue of its radial slots 50, 51. When disc 42 has thus been decoupled from central tube 2, the filter housing is permitted to move unrestrictedly rightwardly along the length of the central tube. The rightward movement of the housing is assisted by the above-described differential pressure produced within the housing by the larger surface area of the end wall of housing section 4a exposed to the fluid pressure as compared to the surface area of the end wall of section 4b. This force may be sufficient by itself to move housing 4 rightwardly, or it may aid the user in manually moving housing 4 rightwardly.

In either event, housing 4 moves rightwardly with respect to the central tube 2 until compartment 30a of filter body 8 becomes aligned with the inlet openings 14 in the central tube; when the housing is so positioned, disc 34 of the filter body 8 has cleared the tubular section 22b of bushing 22 fixed to the central tube 2.

Figure 4:
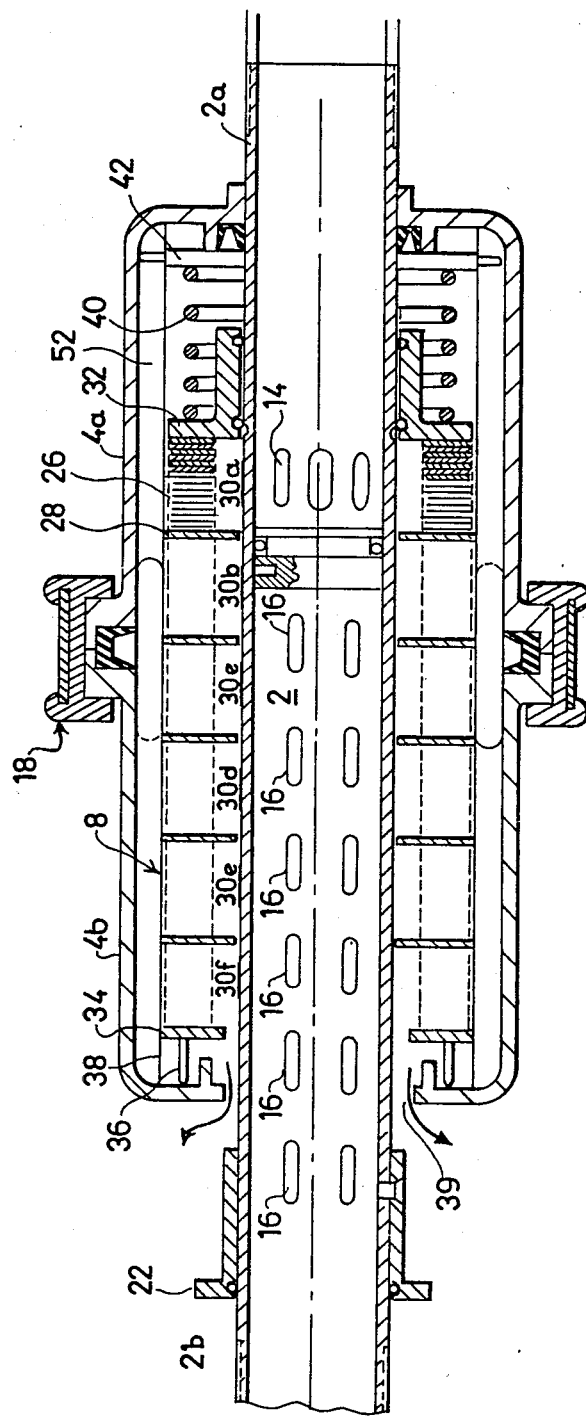
FIG. 4 is a view corressponding to that of FIG. 1 but showing the condition of the parts during a back-flushing operation.

This is the position ilustrated in FIG. 4. In this position the pressurized water is now applied via the inlet openings 14 to the downstream side of the first section of the filter discs 26 via chamber 30a to back-flush the filter discs of this section through the space between the axial ribs 52, 54 in the inner face of the two housing sections 4a, 4b, then through the space 38 between the end disc 34 and the end wall of housing section 4b produced by the fingers 36, and out through passageway 39 which is opened as soon as housing section 4b clears the tubular section 22b of bushing 22. In this manner, compartment 30a of the filter body 8, and the filter discs 26 constituting this section of the filter body, are throughly back-flushed of dirt particles that have accumulated on the outer faces, and between the side faces, of the filter discs 26 of this section of the filter body.

Housing 4 is then moved further rightwardly, either automatically by the above-described differential pressure, or manually and aided by the differential pressure, to bring the compartment 30b of the next section of the filter body 8 into alignment with inlet openings 14, whereupon that section of the filter body is back-flushed in the same manner as described above. Continued movement of housing 4 rightwardly successively back-flushes the remaining filter sections via their compartments 30c, 30d, 30e, 30f.

When the complete filter body 8 has thus been cleaned by back-flushing, housing 4 is manually moved leftwardly to its initial position against flange 22a of bushing 22 and is rotated to seat the inner projections 44 of coupling disc 42 back into the short recesses 46 in the outer face of the central tube 2, whereupon the cleaned filter thereafter operates according to the above-described filter mode of operation.

While the invention has been described with respect to one preferred embodiment, it will be appreciated that many variations and other applications of the invention may be made. For example, the pressure-regulator construction may be used as a pressure-regulator and/or automatic shut-off valve alone, or in combination with other types of devices. In addition the back-flushable filter may also be used alone or in combination with other types of pressure regulators, shut-off valves or the like. Many other variations, modifications and applications of the invention will be apparent.

What is claimed is:

1. A filter device comprising: a central tube having an inlet end and an outlet end connectible into a fluid line for the fluid to be filtered;
   a housing having an inlet end and an outlet end, enclosing said central tube and defining an internal chamber therewith;
   and a filter body within said internal chamber;
   said central tube including an inlet opening therethrough at the inlet end, an outlet opening therethrough at the outlet end, and a plug between said inlet and outlet openings directing the fluid to flow from said inlet opening through said filter body and out through said outlet opening;
   said housing and filter body being mounted for sliding movement axially of said central tube from a normal filtering position wherein the central tube inlet opening communicates with the upstream side of the filter body, to a back-flushing position wherein the central tube inlet opening communicates with the downstream side of at least a portion of the filter body;
   and wherein said housing is constructed to form a passageway at the outlet end of said housing permitting the outletting therethrough of the fluid when the housing has been moved to said back-flushing position.

2. The device according to claim 1, wherein the filter body is divided into a plurality of filter sections, and is movable with the housing during a backflushing operation to successively align each of the sections with said inlet opening in the central tube and thereby to successively effect a back-flushing operation of the respective filter section.

3. The device according to claim 2, wherein each of said filter sections comprises a plurality of annular filter discs between a pair of partition discs all arranged in a stack slidably supported over said central tube.

4. The device according to claim 3, wherein said partition discs have an inner diameter substantially equal to the outer diameter of the central tube, and the filter discs have an inner diameter larger than the outer diameter of the central tube such that each filter section of the filter body includes a compartment defined by a pair of partition discs and the inner faces of the filter discs between them.

5. The device according to claim 1, wherein the housing includes surface areas exposed to the fluid pressure within the housing which produce a differential pressure effective to move said housing and filter body toward said inlet opening in the central tube, said housing further including a spring effective to move the housing and filter body in the direction away from said inlet opening in the central tube.

6. The device according to claim 5, wherein the outlet and inlet ends of the housing are formed with openings receiving said central tube, the inlet housing opening being of smaller diameter than the outlet housing opening to produce said differential pressure.

7. The device according to claim 6, wherein the outlet end of the housing is closed by a bushing secured to said central tube, said bushing including an enlarged head engageable with the outer face of the outlet end of the housing, and a tubular section surrounding the central tube slidably receiving the outlet end of the housing.

8. The device according to claim 1, further including a coupling member movable from a first position coupling said housing to said central tube thereby restricting the axial movement of the housing with respect to the central tube, to a second position decoupling said housing from said central tube thereby releasing the housing for unrestricted axial movement with respect to the central tube.

9. The device according to claim 8, wherein said coupling member comprises a disc seatable in short recesses formed in the outer face of said central tube when the disc is in said first position, said disc being rotatable to said second position to unseat from said short recesses.

10. The device according to claim 9, wherein said disc is formed with a plurality of radial slots to permit its expansion radially in order to unseat from said recesses when rotated from said first to said second position.

11. The device according to claim 9, wherein said housing is made of two sections clamped together, the inner face of each section being formed with a plurality of axially-extending circumferentially-spaced ribs; said coupling disc being formed with outer projections received in the spaces between said ribs for coupling the coupling disc to the housing when the housing is located to rotate the coupling disc from its first position to its second position.

12. A pressure-regulator device, comprising:
   a central tube having an inlet end and an outlet end connectible into a fluid line whose pressure is to be regulated;
   and a housing, having an inlet end and an outlet end, enclosing said central tube and defining an internal chamber therewith;
   said central tube including an inlet opening therethrough at the inlet end, an outlet opening therethrough at the outlet end, and a plug between said inlet and outlet openings directing the fluid to flow from said inlet opening into said internal chamber and out through said outlet opening;
   said housing being mounted for sliding movement axially of said central tube;
   a valve member disposed within said housing and mounted for movment therewith toward and away from said inlet opening in the central tube to thereby restrict or enlarge said inlet opening;
   said housing including surface areas exposed to the fluid pressure within the housing producing a differential pressure normally effective to move said housing in one direction with respect to said inlet opening in the central tube;
   and a spring normally urging said housing and valve member carried thereby in the opposite direction with respect to said inlet opening in the central tube.

13. The device according to claim 12, wherein said surface areas exposed to the fluid pressure within the housing are such that the differential pressure produced thereby is effective to move said housing and valve member in the direction restricting said inlet opening, and said spring is effective to move said housing and valve member in the direction enlarging said inlet opening.

14. The device according to claim 13, wherein the inlet and outlet ends of the housing are formed with openings through which said central tube passes, the inlet housing opening being of smaller diameter than the outlet housing opening to produce said differential pressure.

15. The device according to claim 14, wherein the outlet end of the housing is closed by a bushing secured to said central tube, said bushing including an enlarged head engageable with the outer face of the outlet end of the housing, and a tubular section surrounding the central tube and slidably receiving the outlet end of the housing.

16. The device according to claim 15, further comprising a plurality of inlet openings formed in said central tube arrange in a circular array, said valve member including a tubular section movable over said central tube towards and away from said plurality of inlet openings.

17. The device according to claim 16, wherein said housing includes a filter body within said internal chamber effective to filter the fluid passing therethough.

18. The device according to claim 17, wherein said filter body comprises a plurality of annular filter discs arranged in a stack slidably supported over said central tube, and a plurality of annular partition discs defining a plurality of filter sections each including a pair of partitions discs and a plurality of the filter discs between them, said central tube including a circular array of outlet openings communicating with each of said filter sections.

19. The device according to claim 18, wherein said partition discs have an inner diameter substantially equal to the outer diameter of the central tube, and the filter discs have an inner diameter larger than the outer diameter of the central tube such that each filter section of the filter body includes a compartment defined by a pair of partition discs and the plurality of filter discs between them.

20. The device according to claim 19, further including a coupling member movable from a first position coupling said housing to said central tube thereby restricting the axial movement of the housing with respect to the central tube, to a second position decoupling said housing from said central tube thereby releasing the housing for unrestricted axial movement with respect to the central tube.

21. The device according to claim 20, wherein the outlet end of said housing is formed with a passageway permitting outletting of the fluid therethrough and through said housing outlet opening when the housing has been moved a sufficient distance to align the inlet openings of the central tube with one of said filter sections and to move the housing outlet opening clear of the tubular section of said bushing during a back-flushing operation.

22. The device according to claim 21, wherein said passageway is formed by an end disc having a plurality of axially-extending spacer fingers at the end of the filter stack, which fingers engage the outlet end of the filter housing.

* * * * *